United States Patent [19]

Lucas et al.

[11] 4,194,522
[45] Mar. 25, 1980

[54] AIR PRESSURE REGULATOR

[75] Inventors: Richard L. Lucas, Owosso; John J. Allen, Corunna, both of Mich.

[73] Assignee: Midland-Ross Corporation, Cleveland, Ohio

[21] Appl. No.: 893,194

[22] Filed: Apr. 3, 1978

[51] Int. Cl.² .................... F16K 31/12; G05D 11/00
[52] U.S. Cl. .......................... 137/116.5; 137/505.11; 137/505.25
[58] Field of Search ............. 137/116.5, 505.11, 505.25

[56] References Cited

U.S. PATENT DOCUMENTS

| | | | |
|---|---|---|---|
| 3,064,670 | 11/1962 | Peras | 137/116.5 |
| 3,074,426 | 1/1963 | Billington | 137/505.25 |
| 3,181,560 | 5/1965 | Worden et al. | 137/116.5 X |
| 3,442,502 | 5/1969 | Fischer et al. | 137/116.5 |
| 3,482,591 | 12/1969 | Dufresne | 137/116.5 |
| 3,590,847 | 7/1971 | Worden | 137/508 |
| 3,630,234 | 12/1971 | Hoffman | 137/116.5 X |
| 3,656,497 | 4/1972 | Brown | 137/116.5 |

FOREIGN PATENT DOCUMENTS 649478  1/1951  United Kingdom ................. 137/116.5

*Primary Examiner*—William R. Cline
*Attorney, Agent, or Firm*—H. Duane Switzer

[57] ABSTRACT

An air pressure regulator includes a housing having inlet and outlet ports extending along a common axis. A movable valve member and a piston are positioned in the housing on opposite sides of a housing flow passage. The movable valve member is adjacent the inlet port while the piston is adjacent the outlet port. The piston has a central stem extending through the housing flow passage in radially-spaced relationship thereto for engaging the movable valve member. The piston is normally biased in a direction toward the movable valve member for holding same displaced from a seat around the housing flow passage. When a predetermined pressure exists at the outlet port, the piston moves away from the movable valve member for allowing same to move into engagement with a seat around the housing flow passage for closing such passage.

2 Claims, 2 Drawing Figures

AIR PRESSURE REGULATOR

BACKGROUND OF THE INVENTION

This application relates to the art of pressure regulators and, more particularly, to in-line pressure regulators wherein the inlet and outlet ports extend along a common axis.

In-line pressure regulators of known types include a large number of very complicated parts. This makes such regulators very expensive to manufacture and assemble. Examples of pressure regulators of this type include those disclosed in U.S. Pat. Nos. 3,181,560 and 3,590,847 to Worden.

SUMMARY OF THE INVENTION

A simplified in-line pressure regulator having a minimum number of parts includes a housing having inlet and outlet ports extending along a common axis. A movable valve member and a piston are positioned in the housing on opposite sides of a central housing flow passage. The movable valve member is located adjacent the inlet port while the piston is located adjacent the outlet port. The piston includes a central elongated stem extending through the housing flow passage for engaging the movable valve member. The piston is biased in a direction toward the movable valve member so the piston stem holds the valve member displaced from a seat surrounding the housing flow passage. A predetermined pressure at the outlet port causes the piston to move away from the movable valve member which is biased into engagement with a seat surrounding the housing flow passage for closing same. When the pressure at the outlet port drops below the predetermined value, the piston again moves back toward the movable valve member for displacing same from the seat and again allowing flow from the inlet port to the outlet port.

In a preferred arrangement, the piston has piston flow passages therethrough extending from one piston end facing toward the inlet port and a second piston end facing toward the outlet port. The piston flow passages include a plurality of circumferentially-spaced inclined passages intersecting at an enlarged bore extending into the piston from its second end.

The piston is stepped to define large and small diameter piston portions respectively received in large and small diameter second bore portions. Circumferential seals are positioned between the large and small diameter piston portions and the large and small diameter second bore portions. A shoulder defined between the large and small diameter piston portions faces toward the outlet port and a coil spring biases against the shoulder for normally urging the piston toward the inlet port.

A piston exhaust passage extends through the piston stem and then extends laterally to open outwardly of the piston between the two circumferential seals. A lateral exhaust passage in the housing also communicates with the second bore between the piston seals.

The movable valve member is positioned in a first bore adjacent the inlet port and has flow passages therearound for providing air flow therepast when the movable valve member is displaced from a valve seat surrounding the housing flow passage.

It is a principal object of the present invention to provide an improved in-line air pressure regulator.

It is another object of the invention to provide an in-line pressure regulator having a small number of parts.

It is an additional object of the invention to provide an in-line pressure regulator which is very simple in operation.

DESCRIPTION OF A PREFERRED EMBODIMENT

Figure 1:
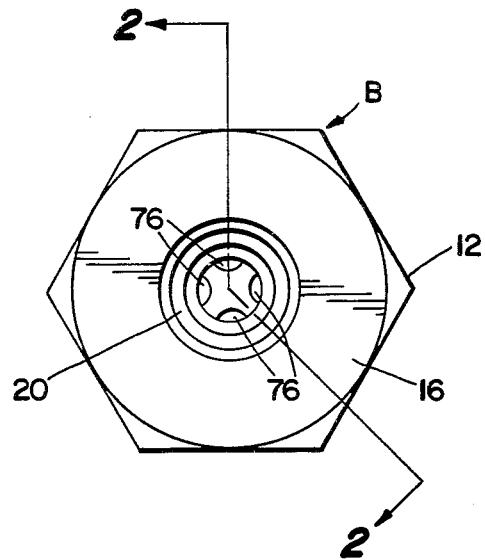
FIG. 1 is an end elevational view looking at the outlet port end of a pressure regulator constructed in accordance with the present invention.

With reference to the drawing, a pressure regulator has a housing B including a body 12 having opposite end caps 14 and 16 secured thereto, and providing inlet and outlet ports 18 and 20 aligned along a common longitudinal axis 22.

A cylindrical first bore 26 is formed in housing body 12 adjacent inlet port 18 and is separated from a second housing bore by a partition 28 having a housing flow passage 30 therethrough coincidental with longitudinal axis 22. A second bore in the housing on the opposite side of partition 28 includes a cylindrical large diameter second bore portion 32 in housing body 12 and a cylindrical small diameter second bore portion 34 in end cap 16.

A movable valve member in the form of a disc 38 is slidably positioned in first bore 26 and has a plurality of circumferentially-spaced flats or holes 40 in the periphery thereof for providing flow therepast. Valve member 38 carries an elastomeric member 42 in a suitable recess and is normally biased by a spring 44 to the left in FIG. 2 toward a circumferential seat 46 surrounding housing passage 30 and facing toward inlet bore 18.

A stepped piston C is positioned in the second housing bore, and includes a large diameter piston portion 50 received in large diameter second bore portion 32 and a small diameter piston portion 52 received in small diameter second bore portion 34. A first circumferential seal 54 is positioned in a groove in piston C, and seals between large diameter second bore portion 32 and large diameter piston portion 50. A second elastomeric circumferential seal 56 is positioned in a suitable circumferential groove in small diameter piston portion 52, and seals between small diameter second bore portion 34 and small diameter piston portion 52.

A circumferential shoulder 60 is formed on piston C between the large and small diameter portions thereof and faces generally toward outlet port 20. A circumferential generally cylindrical recess 62 is formed in an extension on end cap 16 outwardly of small diameter second bore portion 34 and receives a coil spring 66 which biases against piston shoulder 60 for normally urging piston C to the right in FIG. 2 toward inlet port 18 and movable valve member 38. Piston C has a circular flange 68 outwardly of shoulder 60 for aiding and maintaining spring 66 centered.

Piston C has a first end 70 facing toward movable valve member 38 and inlet port 18, and a second piston end 72 facing toward outlet port 20. A cylindrical bore 74 extends axially into piston C from second piston end 72. A plurality of circumferentially-spaced piston flow passages 76 extend through piston C from first end 70 thereof to second piston end 72 thereof by intersecting piston bore 74 adjacent the bottom thereof. Piston flow passages 76 are inclined toward longitudinal axis 22 in a direction from first piston end 70 toward second piston end 72.

An elongated central piston stem 78 extends from first piston end 70 through housing passage 30 in radially inwardly spaced relationship thereto so that flow can take place between stem 78 and housing flow passage 30. A central exhaust passage 80 extends axially through piston stem 78 and intersects a lateral piston exhaust passage 82 which opens outwardly of piston C at a circumferential groove 84 located between seals 54 and 56. A lateral housing exhaust passage 86 in housing body 12 communicates with piston circumferential groove 84. Housing exhaust passage 86 communicates with large diameter second bore portion 32 between seals 54 and 56.

Figure 2:
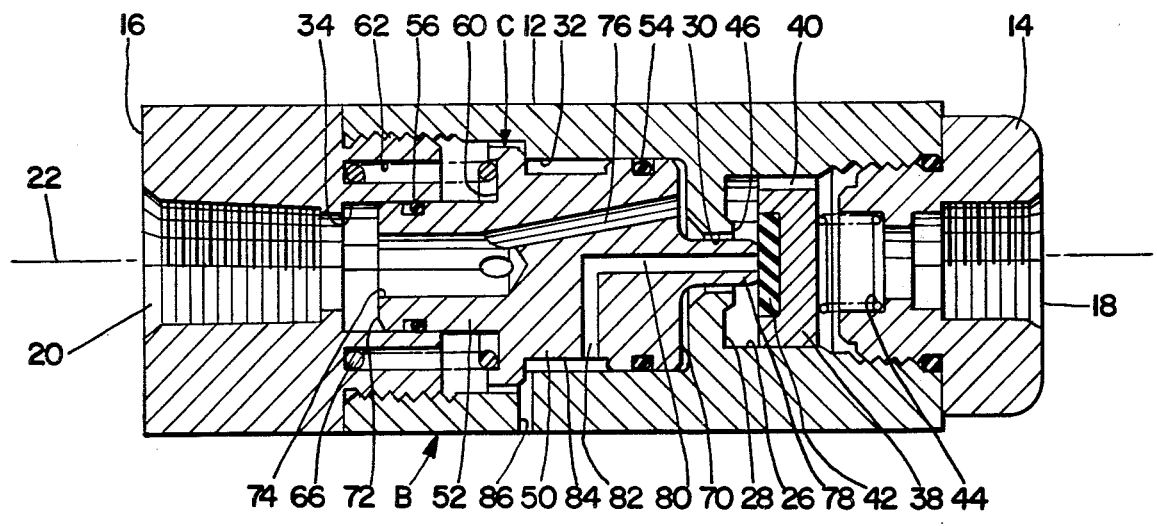
FIG. 2 is a cross-sectional elevational view taken generally on line 2—2 of FIG. 1.

The first biasing means defined by spring 44 biasing against movable valve member 38 has substantially less biasing force than the second biasing means defined by coil spring 66 which biases against piston C. Therefore, the parts are normally positioned as shown in FIG. 2 with stem 78 holding movable valve member 38 displaced from valve seat 46 toward inlet port 18. Flow then occurs from inlet port 18 past movable valve member 38 through passages 40, through housing passage 30, through piston passages 76 and then through outlet port 20. As pressure builds up at outlet port 20, this pressure generally acts on small diameter piston portion 52 within the seal 56. However, this pressure also backs up through piston bore 74 and piston flow passages 76 to act generally on first piston end 70 within seal 54. When the pressure at outlet port 20 builds up to a predetermined value, the pressure acting to the left on piston C within seal 54 is greater than the combined force of the pressure acting on piston C to the right in FIG. 2 by coil spring 66 and the pressure within seal 56. Therefore, piston C moves to the left in FIG. 2 and stem 78 moves away from inlet port 18. This causes elastomeric material 42 on movable valve member 38 to seal against seat 46 around housing flow passage 30 for blocking air flow from inlet port 18 through housing flow passage 30. The end of stem 78 will remain in a lapped position sealed against elastomeric material 42. When piston C moves initially to the left, the pressure within large diameter second bore portion 32 acting against first piston end 70 may be slightly greater than the predetermined desired cut off pressure. Therefore, piston C will move far enough to the left for disengaging the end of stem 78 from elastomeric material 42 which remains sealed against valve seat 46. This will exhaust some pressure from second bore portion 32 through piston exhaust passages 80, 82 and to atmosphere through housing exhaust passage 86. Sufficient pressure will be exhausted for moving piston C back until the end of stem 78 is in a lapped position with elastomeric material 42. As the pressure in outlet port 20 drops, the forces acting to move piston C to the right will again become greater than the force acting tending to move piston C to the left. Therefore, stem 78 will again displace valve member 38 from seat 46 to allow flow from inlet port 18 to outlet port 20.

The supply pressure at inlet port 18 is reduced to a desirable working pressure at outlet port 20 by the improved pressure regulator, and the desired pressure is maintained in the manner described. The working pressure can be adjusted only by changing internal parts such as the biasing force of springs 44, 66. Therefore, the pressure regulator cannot be tampered with by unauthorized persons. However, various working pressures can be provided for the pressure regulator at the factory by varying the pressure which is necessary acting to the left on piston C within seal 54 to shift same to the left.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A pressure regulator comprising: a housing having inlet and outlet ports along a common axis, a first bore in said housing adjacent said inlet port, a second bore in said housing adjacent said outlet port, said second bore being stepped to define a large diameter second bore portion facing said first bore and a small diameter second bore portion facing said oulet port, a central housing passage connecting said bores and having a seat facing said first bore, a movable valve member in said first bore having flow passages therearound for flow of fluid therepast from said inlet port through said housing passage, first biasing means for normally biasing said valve member toward said seat, a stepped piston positioned in said second bore and having a first piston end facing said housing passage and a second piston end facing said outlet port, piston passages through said piston between said first and second piston ends, a stem extending from said first piston end through said housing passage in radially-spaced relationship thereto, second biasing means for normally biasing said piston toward said inlet port for engaging said stem with said valve member and displacing said valve member away from said seat for flow of fluid from said inlet port to said outlet port around said valve member, through said housing passage and through said piston passages, said piston being responsive to a predetermined fluid pressure in said outlet port to move toward said outlet port for engaging said valve member with said seat to block fluid flow from said inlet port through said housing passage, axially-spaced seals between said piston and said large and small diameter second bore portions, a lateral housing exhaust passage in said housing communicating with said second bore between said seals, and a piston exhaust passage extending centrally through said stem and then laterally to open outwardly of said piston between said seals.

2. An in-line pressure regulator comprising: a housing having inlet and outlet ports along a common axis, a first housing bore facing said inlet port, a second housing bore facing said outlet port and including large and small diameter second bore portions, said small diameter second bore portion being adjacent said outlet port and said large diameter second bore portion being adjacent said first housing bore, a central housing passage establishing communication between said first housing bore and said large diameter second bore portion, a valve seat around said housing passage facing toward said first bore, a movable valve member positioned in said first housing bore and having valve member flow passages therearound, first biasing means normally biasing said valve member toward said valve seat, a stepped piston having large and small diameter piston portions respectively received in said large and small diameter second bore portions, a first circumferential seal between said large diameter piston portion and said large diameter second bore portion and a second circumferential seal between said small diameter piston portion and said small diameter second bore portion, said piston having a first piston end on said large diameter portion thereof facing toward said first housing bore, said piston having a second piston end on said small diameter portion thereof facing toward said outlet port, piston flow passages extending through said piston from said first end to said second end thereof, a central stem extending from said first piston end through said housing passage, a piston exhaust passage extending axially through said stem and opening outwardly of said piston between said seals, a lateral housing exhaust passage between said seals, said piston having a piston shoulder between said large and small diameter piston portions facing toward said outlet port, second biasing means acting between said housing and said piston shoulder for biasing said piston toward said inlet port and hold said valve member displaced from said valve seat by engagement thereof by said stem, and said stem having an outer surface spaced inwardly from said housing flow passage, said regulator being operative for flow of fluid from said inlet port past said valve member, through said housing passage around said stem and through said piston flow passages to said outlet port, said piston being responsive to a predetermined pressure at said outlet port to move toward said outlet port for engagement of said valve member with said valve seat, said piston exhaust passage providing exhaust of excessive pressure from said large diameter second bore portion adjacent said first piston end.

* * * * *